(12) United States Patent
Ewert et al.

(10) Patent No.: US 11,780,393 B2
(45) Date of Patent: Oct. 10, 2023

(54) METHOD AND DEVICE FOR OPERATING A SAFETY SYSTEM OF A MOTOR VEHICLE, AND SAFETY SYSTEM FOR A MOTOR VEHICLE

(71) Applicant: Robert Bosch GmbH, Stuttgart (DE)

(72) Inventors: Marlon Ramon Ewert, Untergruppenbach (DE); Darko Rozic, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 769 days.

(21) Appl. No.: 16/343,259

(22) PCT Filed: Oct. 17, 2017

(86) PCT No.: PCT/EP2017/076430
§ 371 (c)(1),
(2) Date: Apr. 18, 2019

(87) PCT Pub. No.: WO2018/077661
PCT Pub. Date: May 3, 2018

(65) Prior Publication Data
US 2019/0248314 A1 Aug. 15, 2019

(30) Foreign Application Priority Data
Oct. 31, 2016 (DE) ...................... 10 2016 221 384.9

(51) Int. Cl.
*B60R 21/0132* (2006.01)
*B60R 21/01* (2006.01)

(52) U.S. Cl.
CPC .......... *B60R 21/0132* (2013.01); *B60R 21/01* (2013.01); *B60R 2021/01013* (2013.01); *B60R 2021/01322* (2013.01)

(58) Field of Classification Search
None
See application file for complete search history.

(56) References Cited

U.S. PATENT DOCUMENTS

| 2003/0109939 | A1* | 6/2003 | Burgdorf | G01D 3/0365 700/71 |
| 2005/0183501 | A1* | 8/2005 | Saito | G01C 21/183 73/497 |
| 2018/0329044 | A1* | 11/2018 | Nomura | G01S 15/87 |

FOREIGN PATENT DOCUMENTS

| DE | 42 28 893 A1 | 3/1994 |
| DE | 10 2004 030 972 A1 | 1/2006 |

(Continued)

OTHER PUBLICATIONS

International Search Report corresponding to PCT Application No. PCT/EP2017/076430, dated Feb. 2, 2018 (German and English language document) (7 pages).

*Primary Examiner* — Aniss Chad
*Assistant Examiner* — Mahmoud M Kazimi
(74) *Attorney, Agent, or Firm* — Maginot, Moore & Beck LLP

(57) ABSTRACT

A method for operating a safety system of a motor vehicle includes correcting an output signal of a measuring sensor as a function of a current temperature value measured by a temperature sensor. The motor vehicle includes a sensor device with the measuring sensor to detect a collision and the temperature sensor. The method further includes determining an intrinsic heat of the measuring sensor generated by the operation of the measuring sensor and correcting the output signal as a function of the determined intrinsic heat.

11 Claims, 2 Drawing Sheets

(56) References Cited

FOREIGN PATENT DOCUMENTS

| | | |
|---|---|---|
| DE | 10 2011 116 755 A1 | 4/2013 |
| JP | 2005-121576 A | 5/2005 |
| JP | 2008-542118 A | 11/2008 |
| JP | 2015-229149 A | 12/2015 |
| WO | 01/50090 A1 | 7/2001 |
| WO | 2017/090546 A1 | 6/2017 |

* cited by examiner

METHOD AND DEVICE FOR OPERATING A SAFETY SYSTEM OF A MOTOR VEHICLE, AND SAFETY SYSTEM FOR A MOTOR VEHICLE

This application is a 35 U.S.C. § 371 National Stage Application of PCT/EP2017/076430, filed on Oct. 17, 2017, which claims the benefit of priority to Serial No. DE 10 2016 221 384.9, filed on Oct. 31, 2016 in Germany, the disclosures of which are incorporated herein by reference in their entirety.

The invention disclosure relates to a method for operating a safety system of a motor vehicle, in particular an airbag system, having a sensor device with at least one measuring sensor for detecting a collision and having at least one temperature sensor, wherein an output signal of the measuring sensor is corrected as a function of a current temperature value measured by the temperature sensor.

In addition, the disclosure relates to a device for operating a safety system of a motor vehicle, which is designed to implement the above method. The disclosure also relates to a computer program as well as a machine-readable storage medium and a safety system.

BACKGROUND

Methods and devices for operating safety systems of motor vehicles, together with corresponding safety systems, are known from the prior art. To increase the safety of vehicle occupants and other road users it is known to equip a motor vehicle with a safety system, which in the event of a collision automatically initiates safety measures. One of the best-known safety systems is the airbag system. This comprises one or more airbag devices, which are triggered to protect vehicle occupants from injury in the event of a collision being detected.

For the detection of frontal collisions, acceleration sensors are currently used as the measuring sensors. These are preferably arranged in the central control unit and/or along a flexible cross-member of the motor vehicle. For the detection of side collisions, either pressure or acceleration sensors are currently used. These are usually located on the B-, C- or D-pillar of the motor vehicle (acceleration sensors) or in the vehicle door (pressure sensors). The amplitude of the respective output signal of the measuring sensor which is detected in each case depends on such factors as the mass and the speed of the impacting object during the collision.

To detect accidents involving pedestrians, it is known to use a sensor device in the vehicle fender, which usually has two or more acceleration sensors. It is also known to provide a pressure hose-based sensor system.

The collision signals detected by the sensor device or the output signals issued by the respective measuring sensor are compared with threshold values in order to decide whether or not to trigger a safety device, in particular an active restraint means, for example an airbag.

In order to avoid false alarms, it is also known to calibrate or to compensate the measuring signal of the respective measuring sensor in operation, in particular as a function of the current temperature. For example, the patent specification DE 10 2004 030 972 A1 proposes to store the most important parameters of the measuring sensor in a memory and to take these into account to provide a correction for a temperature characteristic of the measuring sensor. From the patent specification DE 42 28 893 A1 it is also known as a means of compensating for non-linearities of the output signal of a measuring sensor, in particular to compensate for temperature dependencies of the sensor signal, to provide a temperature sensor or transducer in addition to the measuring sensor, which detects the temperature in the immediate vicinity of the measuring sensor.

SUMMARY

The method according to the disclosure has the advantage that a temperature correction or compensation is carried out during operation particularly accurately, thus guaranteeing a safe activation or non-activation of the one or more means of restraint of the safety system. To this end, it is provided according to the disclosure that an intrinsic heat of the measuring sensor generated by the operation of the measuring sensor is determined and the measured temperature is corrected as a function of the determined intrinsic heat. The disclosure thus provides that an intrinsic heat of the measuring sensor is determined, in particular calculated, during operation. This has the advantage that in addition to the measured temperature value, an estimate of the temperature of the measuring sensor itself is made, which takes account of the consideration that the temperature determined by the temperature sensor does not necessarily exactly match the temperature of the measuring sensor. This is the case, for example, if the temperature sensor is arranged on the motor vehicle remotely from the measuring sensor, so that the heat of the measuring sensor itself cannot be detected by the temperature sensor and cannot be taken into account in the temperature measurement. Detecting the intrinsic heat therefore ensures a more accurate measurement of the temperature and therefore a more accurate compensation of the measuring signal of the measuring sensor. The temperature sensor is preferably arranged close to the measuring sensor, in particular in the measuring sensor housing, so that the temperature value measured by the temperature sensor is distorted by the intrinsic heat of the sensor. By then subtracting the determined intrinsic heat of the measuring sensor from the measured temperature value, as is preferably provided, the actual ambient temperature of the measuring sensor can be determined, and therefore, for example, a threshold adjustment for the activation or non-activation of a safety device can be carried out to a high accuracy. The calculation, or the calibration/compensation of the output signal of the measuring sensor, is preferably carried out by the measuring sensor itself or by a sensor module which comprises a measuring sensor and/or by a device, such as a control unit, which is connected to the measuring sensor signal at least for signal transmission. By means of the method the temperature of the sensor environment is therefore estimated, by the measured temperature being corrected or compensated for by the determined intrinsic heat of the measuring sensor.

In accordance with a preferred extension of the disclosure it is provided that the intrinsic heat is determined as a function of an electrical operating voltage of the measuring sensor. For example, the operating voltage can be between 4V and 12V, in particular between 4.8V and 11.0V. Depending on the operating voltage present on the measuring sensor, the intrinsic heat increases (with increasing operating voltage) or decreases (with decreasing operating voltage). By monitoring the electrical operating voltage, the intrinsic heat of the measuring sensor is thus determined, in particular calculated or estimated.

It is additionally preferably provided that the intrinsic heat is determined as a function of an electrical operating current of the measuring sensor. The operating current also has a direct influence on the temperature, or the temperature response, of the measuring sensor itself. By taking into account the electrical operating current, the intrinsic heat can therefore be measured more precisely. There are usually no additional resources required to determine the operating voltage and/or the operating current, because a corresponding sensor unit or evaluation circuitry for this purpose is usually already present in any case. This enables the operation of the safety system to be improved in a simple and cost-effective way.

In particular, is provided that the intrinsic heat is determined as a function of a communication system or communication protocol, by means of which the measuring sensor is operated. Depending on which communication system or protocol is provided to evaluate the data of the measuring sensor, its operating power and possibly its operating voltage changes. Having regard to the communication system and/or protocol used, the accuracy of the determination of the intrinsic heat can therefore be improved in a simple manner.

In accordance with a preferred extension of the disclosure it is provided that the intrinsic heat is determined as a function of a housing of the measuring sensor. In particular, the intrinsic heat generated by the measuring sensor is influenced by a geometric and/or material technical composition of the housing. In particular, depending on the thermal efficiency of the housing, a detectable temperature response of the measuring sensor itself is obtained. If this sensor has a housing with, for example, a small coefficient of thermal conductivity, then this means that the measuring sensor itself heats up or reaches a higher operating temperature faster. If, on the other hand, the housing has a good coefficient of thermal conductivity, the heat is dissipated out of the measuring sensor so that the latter is cooled and its intrinsic temperature reaches a lower peak value. Having regard to the composition of the housing thus enables the intrinsic heat of the measuring sensor to be determined with high accuracy.

It is additionally preferably provided that the intrinsic heat is determined as a function of a sensor type of the measuring sensor. Depending on the sensor type of the measuring sensor used, thus depending on the design of the measuring sensor, a separate intrinsic heat is therefore produced. By taking into account the sensor type, the intrinsic heat can thus be determined in a convenient way. Advantageously, values for the sensor type, the sensor housing, the communication system, the operating voltage and/or the operating current characteristic are stored in a non-volatile memory of the sensor device, so that the advantageous compensation of the measuring signal of the measuring sensor takes place in the sensor device itself in a simple, resource-efficient and rapid manner.

In accordance with a preferred extension of the disclosure it is provided that the corrected temperature and/or the temperature value and the determined intrinsic heat are transmitted to a device, in particular a control unit of the safety system. This means that the device or the control unit receives either the already corrected temperature or it receives the temperature value and the determined intrinsic heat, in order to correct the temperature itself, so that a more accurate activation of at least one safety device of the safety system is ensured.

The device according to the disclosure is characterized in that the device is configured, under normal conditions of use to carry out the method according to the disclosure. This results in the advantages already mentioned. A control unit represents a preferred embodiment of the device according to the disclosure.

A further aspect of the present disclosure is a computer program, which is specifically configured, under normal conditions of use, to carry out all steps of the method according to the present disclosure.

A further aspect of the present disclosure is a machine-readable storage medium, on which a computer program according to the present disclosure is stored.

The safety system according to the disclosure for a motor vehicle is characterized by the control device according to the disclosure. Here also, the previously mentioned advantages are obtained. In particular, it is provided that the measuring sensor has a housing, in which the temperature sensor is also arranged. This ensures an optimal temperature compensation of the measuring signal of the measuring sensor. The device which carries out the method according to the disclosure is preferably also arranged in the housing according to the disclosure. As a result, the measuring sensor or a sensor module comprising the measuring sensor, the temperature sensor, the housing and the device, carries out the method itself and therefore already outputs a corrected measurement signal, which is forwarded in particular to a control unit, in particular belonging to the safety system, for further use. Alternatively, it is preferably provided that the device is designed as a separate control unit, which is connected to the sensor module, in particular to the measuring sensor and/or to the temperature sensor.

BRIEF DESCRIPTION OF THE DRAWINGS

Further advantages and preferred features and feature combinations result from the disclosure. In the following the disclosure will be explained in further detail by reference to the drawings. Shown are.

DETAILED DESCRIPTION

Figure 1:
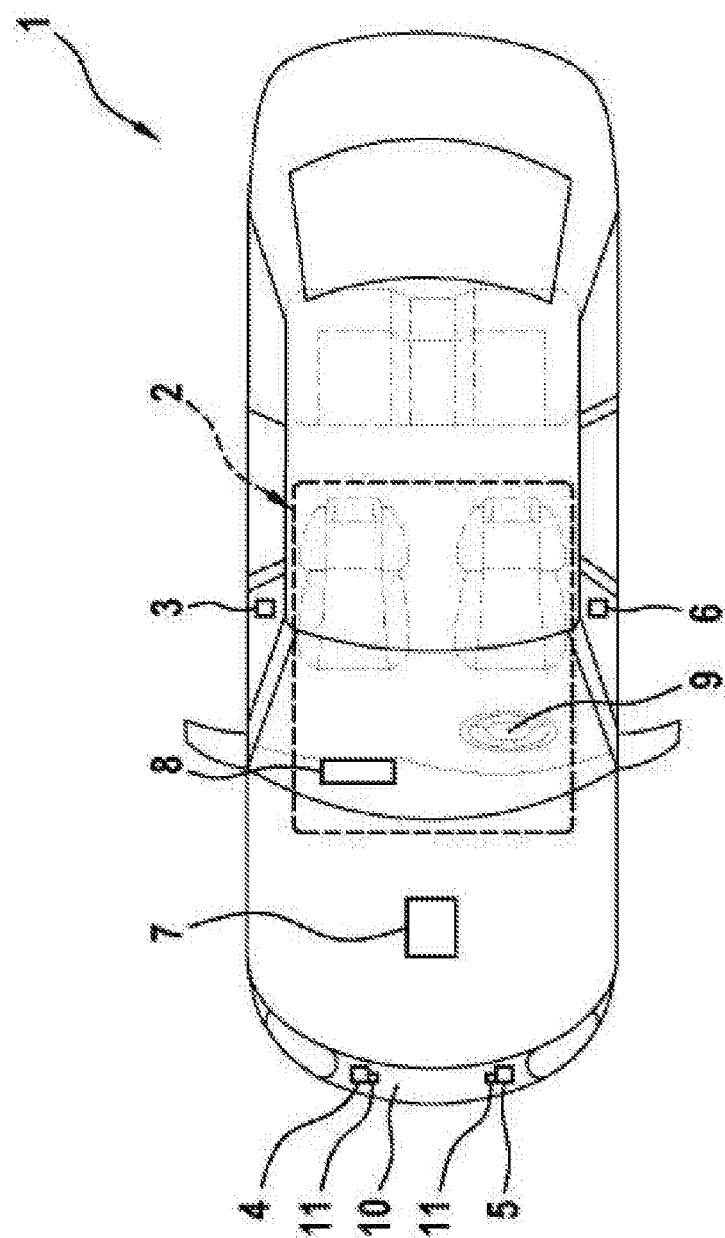
FIG. 1 a motor vehicle with a safety system in a simplified representation.

FIG. 1 shows a simplified plan view of a motor vehicle 1, which has an advantageous safety system 2. This safety system 2 in the present case is designed as an airbag system, which has a plurality of measuring sensors 3, 4, 5, 6, a control unit 7 as well as a plurality of safety devices 8, 9, in the present case in the form of airbag devices.

The measuring sensors 3 to 6 as well as the safety devices 8 and 9 are each connected to the control unit 7, wherein this connection is understood to mean an electrical connection signal or the signal transmission connection, by means of which on the one hand, the output signals generated by the measuring sensors 3 to 6 are detected and evaluated by the control unit 7 and the safety devices 8 and 9 can be activated by the control unit 7 as a function of the detected output signals. The control unit 7 in this case is designed as an airbag control unit.

In accordance with the present exemplary embodiment the measuring sensors 3 and 6 are arranged in vehicle doors of the motor vehicle 1 and are designed as pressure sensor modules. The measuring sensors 4 and 5 are installed in a front fender 10 of the motor vehicle 1 and designed as acceleration sensor modules. In particular, these are used to detect accidents involving pedestrians with the motor vehicle 1. A further optional sensor module, which has a rotation rate sensor, is arranged in particular at or on the control unit 7.

Appropriate safety systems are already known from the prior art, so that the specific use and design of the overall system 2 will not be discussed in further detail here. It is also self-evident that the safety system 2 can have more or fewer measuring sensors 3 to 6 and more or fewer safety devices 8 to 9.

The sensor device also comprises temperature sensors 11, which in accordance with this exemplary embodiment are arranged in the front fender 10 in order to detect the ambient temperature of the measuring sensors 4 and 5. The temperature sensors 11 are each assigned to one of the measuring sensors 4, 5 in such a way that one temperature sensor 11 is arranged in a housing of each measuring sensor 4, 5. Therefore, the respective temperature sensor detects the ambient temperature of the respective measuring sensor 4, 5 in the immediate environment or vicinity of the respective measuring sensor 4, 5. The temperature value currently detected by the temperature sensor 11 is also evaluated by the control unit 7. In this connection, it is already known to adjust threshold values, with which the measurement signals captured or output by the measuring sensors 4, 5 are compared, as a function of the detected temperature value in order to ensure an optimal activation response of the safety devices 8 and 9.

It is therefore advantageously provided in this case that in an advantageous method, the intrinsic heat of the measuring sensor generated in the operation of the measuring sensor is determined, in order to determine the actual temperature value prevailing at or in the measuring sensor 4, 5.

Figure 2:
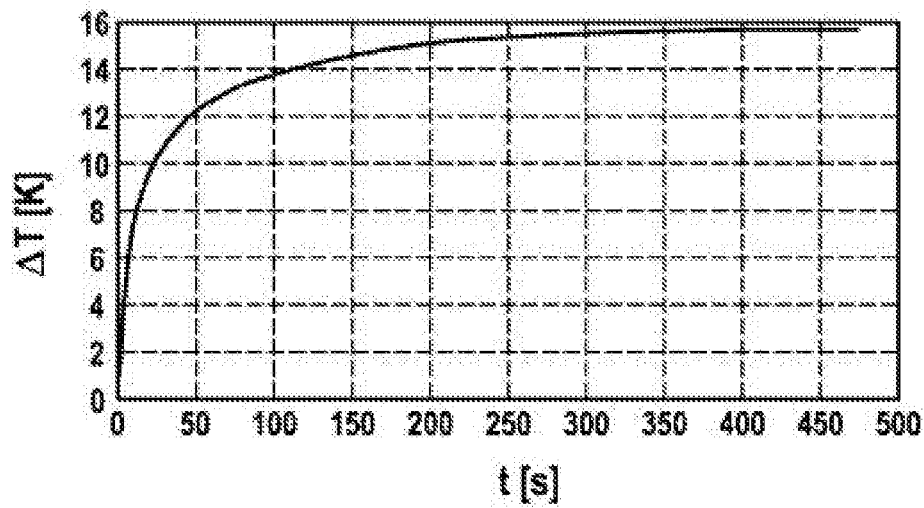
FIG. 2 a temperature differential characteristic curve of a measuring sensor of the safety device and FIG. 3 a method for operating the safety system.

To explain the method, FIG. 2 shows an example of a temperature difference characteristic Kl, which may be obtained in one of the measuring sensors in operation. The temperature difference characteristic shows the deviation in the temperature of the measuring sensor from a temperature ΔT measured in the environment of the sensor over time t. In this example, the intrinsic heat of the measuring sensor is, for example, 140 K/W.

In this case, the measured temperature value is corrected as a function of the determined intrinsic heat, wherein the intrinsic heat is measured or determined in particular as a function of the relationships described in the following.

Depending on the geometric and technical material-related conditions of the respective measuring sensor, in particular depending on the respective housing of the measuring sensor 4, 5, a different temperature response of the measuring sensor in the housing is obtained. It is therefore provided that the intrinsic heat is determined as a function of the housing, in particular as a function of the material-related or geometric design of the housing. To this end, in particular a correction factor is stored in a non-volatile memory particularly of the respective measuring sensor 4, 5. The correction factor is in particular a correction value and/or a correction characteristic curve, which shows, for example, a temperature response over time as a function of the particular housing.

In addition, it is alternatively or additionally provided that the intrinsic heat of the respective measuring sensor 4, 5 is determined as a function of the electrical operating voltage applied to the measuring sensor. In the case of a safety system with airbag devices, as described in the present case, the applied operating voltage can be a voltage between approximately 4.8 V and 11.0 V. Depending on the applied voltage, the temperature of the measuring sensor increases more strongly or less strongly. The same applies to the operating current of the respective measuring sensor 4, 5, which is preferably also used for correcting or compensating the measured temperature value and for determining the intrinsic heat of the respective measuring sensor 4, 5. In this case, the operating current depends in particular on the communication protocol used, by means of which the respective measuring sensor 4, 5 is addressed. In the present case, in particular, it is provided that the measuring sensors 3 to 6 communicate with the control unit 7 via the so-called PSI5 protocol. As a result, a known operating current is obtained, which is taken into account in the determination of the intrinsic heat generated by the respective measuring sensor.

The described effects impact directly on the measured temperature, which is measured, for example, by means of a temperature diode in the vicinity of the respective measuring sensor 4, 5. The temperature diode is, in particular, the temperature sensor already described. Therefore the measured temperature value deviates from the actual ambient temperature around the measuring sensor due to the intrinsic heat of the measuring sensor. By the compensation of the measured temperature value described in the following, in particular, the threshold values, with which the output signal of the respective measuring sensor 4, 5 is compared, are adjusted to prevent a false activation or false non-activation of the safety devices 8, 9.

The time constants T for the various relevant parameters, such as in particular, operating voltage, operating current, communication protocol/system, housing and/or measured temperature value, are preferably determined experimentally at the manufacturing stage and stored in a non-volatile memory of the respective measuring sensor 4, 5. The temperature curves of the respective measuring sensor 4, 5 are then described with the corresponding time constants using a mathematical formula, which takes the operating voltage, the communication mode, the housing and/or operating current as input variables and as a function of these input variables, returns a highly accurate, compensated temperature for the respective measuring sensor 4, 5. The mathematical formula or the individual temperature curves are preferably stored in a memory of the measuring sensor 4, 5, for example, as software and/or hardware, and at any time allow the calculation of the compensated temperature in the respective measuring sensor 4, 5 at any time.

In particular, the intrinsic heat TE or the heating component is calculated using the following formula:

$$TE = Rth * P\_eff,$$

where Rth is the thermal resistance to be determined, Peff is the effective power consumption of the measuring sensor, i.e. in particular the operating voltage and preferably the mean operating current, which is derived from the selected communication mode, in particular according to the PSI5 protocol. The following applies:

$$P_{eff} = \frac{1}{T} \int_{t_g}^{t_g+T} u(t)i(t)dt$$

The compensated temperature value $T_K$ is then obtained from the measured temperature $T_g$ minus the calculated intrinsic heat $T_E$:

$$T_K = T_g - T_E$$

Conveniently, the component of the operating voltage, the operating current, the sensor type and the housing for the intrinsic heat are determined by simulation techniques, experimentally and/or computationally.

Once the temperature has been determined with high precision by the correction based on the intrinsic heat of the measuring sensor, it is transmitted by means of the PSI5 communication to the control unit 7 where it is used for the temperature-dependent threshold adjustment. It is also conceivable that in the calculation of the compensated, corrected temperature inside the measuring sensor, an interpolation is performed in order to simplify the calculation. By means of the advantageous method it is then possible to determine an exact threshold adjustment for the control unit 7 using the specific heat that relates to the respective measuring sensor. According to an alternative embodiment it is provided that raw data of the respective measuring sensor 4, 5 and of the respective temperature sensor 11 are transmitted to the control unit 7, and only evaluated there as described previously. While this exemplary embodiment has been discussed only with reference to the measuring sensors 4, 5, in particular it is provided that the measuring sensors 3, 6 are accordingly each assigned a temperature sensor 11, and that a compensation of the measuring signal of the measuring sensors 3 and 6 is performed as described above, to ensure a highly accurate activation of the safety devices 8, 9.

Figure 3:
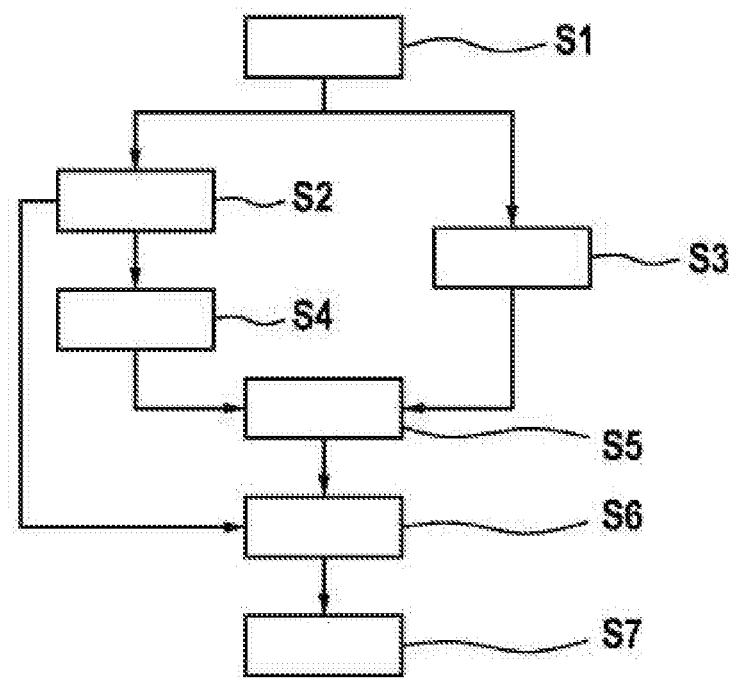

FIG. 3 shows the main steps of the advantageous method, clearly summarized again in a flow chart. In a first step S1, the safety system or the vehicle having the safety system is set into operation. Then, in a step S2 at least one of the measuring sensors 3 to 6 is put into operation or activated to detect an acceleration or a pressure change in order, as previously described, to detect a collision of the motor vehicle with another road user or with an object in the environment of the motor vehicle 1. In a step S3, by means of the respective temperature sensor 11 and in particular simultaneously, the current ambient temperature of the respective measuring sensor 3 to 6 is detected, in particular within the respective housing.

While the respective measurement sensor 3 to 6 is in operation, in a step S4 its intrinsic heat is determined as previously described, in particular as a function of its electrical operating voltage, its electrical operating current, the communication system and/or communication protocol, the housing of the respective measuring sensor 3 to 6 and/or the sensor type of the respective measuring sensor 3 to 6. In particular, the procedure followed is as previously described.

Then, in a step S5 the ambient temperature recorded by the respective temperature sensor 11 is corrected using the calculated specific heat of the respective measuring sensor 3 to 6, to which the respective temperature sensor 11 is assigned, as described above.

In a subsequent step S6 the output signal provided by the respective measuring sensor 3 to 6 is corrected or calibrated by means of the corrected temperature. As an alternative, it is preferably provided that by means of the corrected temperature one or more thresholds, with which, in particular, the output signal of the respective measuring sensor is compared, are adjusted in the control unit 7 to ensure an optimal activation of the safety devices 8, 9. In the following step S7 therefore, either the corrected output signal or a corrected or a plurality of corrected threshold values is provided, by means of which the safety system 2 is operated.

The invention claimed is:

1. A method for operating a safety system of a motor vehicle, comprising:
   detecting a measured temperature in a vicinity of a measuring sensor of the safety system using a temperature sensor of the sensor device, the measuring sensor being configured to generate an output signal indicative of whether the motor vehicle is in a collision;
   determining an intrinsic heat of the measuring sensor generated by operation of the measuring sensor using the control device of the safety system;
   correcting the measured temperature as a function of the determined intrinsic heat using the control device; and
   adjusting the output signal of the measuring sensor based on the corrected measured temperature.

2. The method as claimed in claim 1, further comprising:
   determining the intrinsic heat as a function of an electrical operating voltage of the measuring sensor.

3. The method as claimed in claim 1, further comprising:
   determining the intrinsic heat as a function of an electrical operating current of the measuring sensor.

4. The method as claimed in claim 1, further comprising:
   determining the intrinsic heat as a function of a communication system and/or protocol by which the measuring sensor is operated.

5. The method as claimed in claim 1, further comprising:
   determining the intrinsic heat as a function of a housing of the respective measuring sensor.

6. The method as claimed in claim 1, further comprising:
   determining the intrinsic heat as a function of a sensor type of the measuring sensor.

7. The method as claimed in claim 1, further comprising:
   transmitting the corrected output signal and/or the current temperature value and the determined intrinsic heat to the control device of the safety system.

8. The method as claimed in claim 1, wherein a computer program, under normal conditions of use, is configured to carry out all steps of the method.

9. The method as claimed in claim 8, wherein a machine-readable storage medium stores the computer program.

10. A control device, for operating a safety system of a motor vehicle, comprising:
    a sensor device with a measuring sensor configured to detect a collision of the motor vehicle; and
    a temperature sensor,
    wherein the control device is configured to:
      detect a measured temperature in a vicinity of the measuring sensor using the temperature sensor, the measuring sensor being configured to generate an output signal indicative of whether the motor vehicle is in a collision;
      determine, under normal conditions of use of the control device, an intrinsic heat of the measuring sensor generated by the operation of the measuring sensor;
      correct the measured temperature as a function of the determined intrinsic heat; and
      adjust the output signal of the measuring sensor based on the corrected measured temperature.

11. A safety system for a motor vehicle, comprising:
    an activatable safety device; and
    a sensor device including:
      a measuring sensor configured to detect a collision of the motor vehicle; and
      a temperature sensor,
    wherein the activatable safety device is configured to:
      detect a measured temperature in a vicinity of the measuring sensor using the temperature sensor, the measuring sensor being configured to generate an output signal indicative of whether the motor vehicle is in a collision;
      determine, under normal conditions of use of the control device, an intrinsic heat of the measuring sensor generated by the operation of the measuring sensor;
      correct the measured temperature as a function of the determined intrinsic heat; and adjust the output signal of the measuring sensor based on the corrected measured temperature.

* * * * *